United States Patent [19]

Prokop et al.

[11] Patent Number: 5,267,759
[45] Date of Patent: Dec. 7, 1993

[54] CONNECTOR ASSEMBLY

[75] Inventors: Heinz J. Prokop, Yokohama, Japan; Michael Hacker, Wimshein, Fed. Rep. of Germany

[73] Assignee: Trumpf Lasertechnik GmbH, Ditzingen, Fed. Rep. of Germany

[21] Appl. No.: 882,934

[22] Filed: May 14, 1992

[30] Foreign Application Priority Data

May 14, 1991 [DE] Fed. Rep. of Germany ... 9105956[U]

[51] Int. Cl.$^5$ ............................................. F16L 17/02
[52] U.S. Cl. ...................... 285/346; 285/353; 285/358; 285/906
[58] Field of Search ............... 285/346, 338, 196, 162, 285/178, 404, 353, 358, 906

[56] References Cited

U.S. PATENT DOCUMENTS

| 3,695,642 | 10/1972 | DeWoody | 285/346 X |
| 4,286,139 | 8/1981 | Taylor | 285/196 X |
| 4,406,484 | 9/1983 | Ramer | 285/346 X |
| 4,749,215 | 6/1988 | Martin | 285/346 X |

FOREIGN PATENT DOCUMENTS 149078  8/1920  United Kingdom ............... 285/346

Primary Examiner—Dave W. Arola

[57] ABSTRACT

A connector assembly for resiliently actuated coupling of a first component of cylindrical configuration to a second component with a cylindrical recess utilizes a pair of interfitting inner and outer annular ring elements having first and second axial ends and axially extending overlying body portions. The first ends extend inwardly of the recess and the second ends are in surface contact with the circumferential surface of the cylindrical component. Each ring elements has a radially extending flange on one of its ends which extends along the ends of the other ring element into close surface relationship with one of the components. Resiliently deformable annular elements are disposed between the radial flange of each of the ring elements and the body portion of the other ring element, and adjustable elements on the two ring elements effect axial movement of the ring elements relative to each other to effect deformation of the resiliently deformable elements, thereby producing tensioning forces between the deforming elements and the component in surface contact therewith to secure the components in assembly.

15 Claims, 3 Drawing Sheets

CONNECTOR ASSEMBLY

BACKGROUND OF THE INVENTION

The present invention relates to connector assemblies to effect a connection between a housing and a tubular element, and, more particularly, a component such as a laser tube having its end mounted in or communicating with a recess in a block or like housing.

Tension springs, are often used to connect two components by spring action. When the spring action is in the direction of the force to be transmitted, the spring force must be larger than the force transmitted. Such assemblies may take many forms and may also be used as safety devices to prevent overloads. Thus, for example, ring tensioning assemblies elements are known in which round tension disks, which are slightly conical, are disposed adjacent a cylindrical component such as a shaft and also adjacent the bore for the shaft. If the ring tension disk is deformed in the direction of the axis of the cylindrical component, they are then supported both on the periphery of the cylindrical component and also in the cylindrical recess in which it is inserted. One or more adjustment devices may be arranged coaxially to provide the axial deformation to move the ring tension disks between the two components. As a rule, the adjustment devices consist of threaded elements such as screws which are evenly distributed about the periphery of the two components and which act on the ring tension disks. When the screws are tightened, the ring tension disks are deformed. Because of the high friction forces between the ring tension disks and the components, the forces acting on one component are transferred through the ring tension disks if the forces to be transmitted are less than the force of friction.

In another embodiment of a round spring connection, ring elements have a pair of conical surfaces, one ring element having an inner conical surface and the other ring element having an outer conical surface. The ring elements are moved oppositely of one another in the axial direction by means of an adjustment device. Because the cones are paired, one ring element is expanded and the other is compressed, and the components to be connected to one another are engaged by this resilient deformation. This connecting device has the disadvantage that a relatively large space is needed in the radial direction between the two components in order to be able to use the round ring connection.

Accordingly, it is an object of the present invention to provide a novel connector assembly for use between a cylindrical member and a second member having a recess with which the cylindrical member is connected.

It is also an object to provide such a connector assembly which is relatively simple to fabricate and assemble.

Another object is to provide such a connector assembly which is of relatively small radial dimension and which effects good sealing action with the components.

A further object is to provide such a connector assembly in which the connecting force may be readily adjusted.

SUMMARY OF THE INVENTION

It has now been found that the foregoing and related objects may be readily attained in a connector assembly for resiliently actuated coupling of a first component of cylindrical configuration to a second component with a cylindrical recess. This assembly comprises a pair of interfitting inner and outer annular ring elements having first and second axial ends and axially extending overlying body portions. The first ends of the ring elements are dimensioned to extend inwardly of the recess in the second component with the second ends being spaced outwardly thereof and in close surface relationship with the circumferential surface of the cylindrical component. The inner ring element has a radially outwardly extending flange at its first end dimensioned to extend into surface contact with the wall of the recess of the second component and beyond the first end of the body portion of the outer ring element. The outer ring element has a radially inwardly extending flange at its second end dimensioned to extend along the second end of the inner ring element into close surface relationship with the cylindrical first component.

Disposed between the radial flange on each of the ring elements and the body portion of the other ring element are resiliently deformable annular elements. Adjusting means effects axial movement of the ring elements relative to each other to effect deformation of the resiliently deformable elements, thereby producing tensioning forces between the deformed elements and the component in surface contact therewith to secure the components in assembly.

In the preferred embodiment, the adjusting means additionally secures the ring elements in axial assembly, and the adjusting means is comprised of cooperating elements disposed in the ring elements. The cooperating elements may comprise an adjustable element adjustably seated in the outer ring element with a surface portion at its inner end which cooperates with the surface of a recess in the inner ring element so that movement of the adjustable element produces the relative axial movement of the ring elements.

In one embodiment of adjusting device, the surface portion of the adjustable element may be provided with an eccentrically oriented, generally cylindrical end portion, and the cooperating surface of the recess in the inner ring element by the side surface of an annular groove in the outer periphery of the inner ring element. In another embodiment, the surface portion of the adjustable element may be provided with a conically surfaced end portion and the cooperating surface of the recess may be provided by an inclined side surface of a groove in the periphery of the inner ring element. In the first embodiment, the rotatable adjustable element may move radially of the outer ring element, and the groove extends about the circumference of the inner ring element and is of generally V-shaped cross section. In the second embodiment, the adjustable element is rotatable in its ring element to effect rotational adjustment of its eccentric end portion.

Preferably, several adjustment means are evenly spaced about the periphery of the ring elements. The resiliently deformable elements are conveniently elastomeric sealing rings of generally circular cross section, and the adjustable element may be secured against inadvertent disassembly from the outer ring member by holding means in the outer ring element.

In another embodiment, overlying adjacent axially extending portions of the ring elements are cooperatively threaded to effect adjustably threaded engagement thereof.

Desirably, the body portion of the outer ring element has a portion of reduced diameter at its first end providing an axial shoulder adapted to seat against the side surface of the recess and a radial shoulder adapted to seat against the surface of the second component outwardly of its recess. The flange on the outer ring element has a recess in the periphery of its face adjacent the inner ring element in which the annular element is disposed in surface contact with the end of the inner ring element.

DETAILED DESCRIPTION OF THE PREFERRED EMBODIMENT

Figure 1:
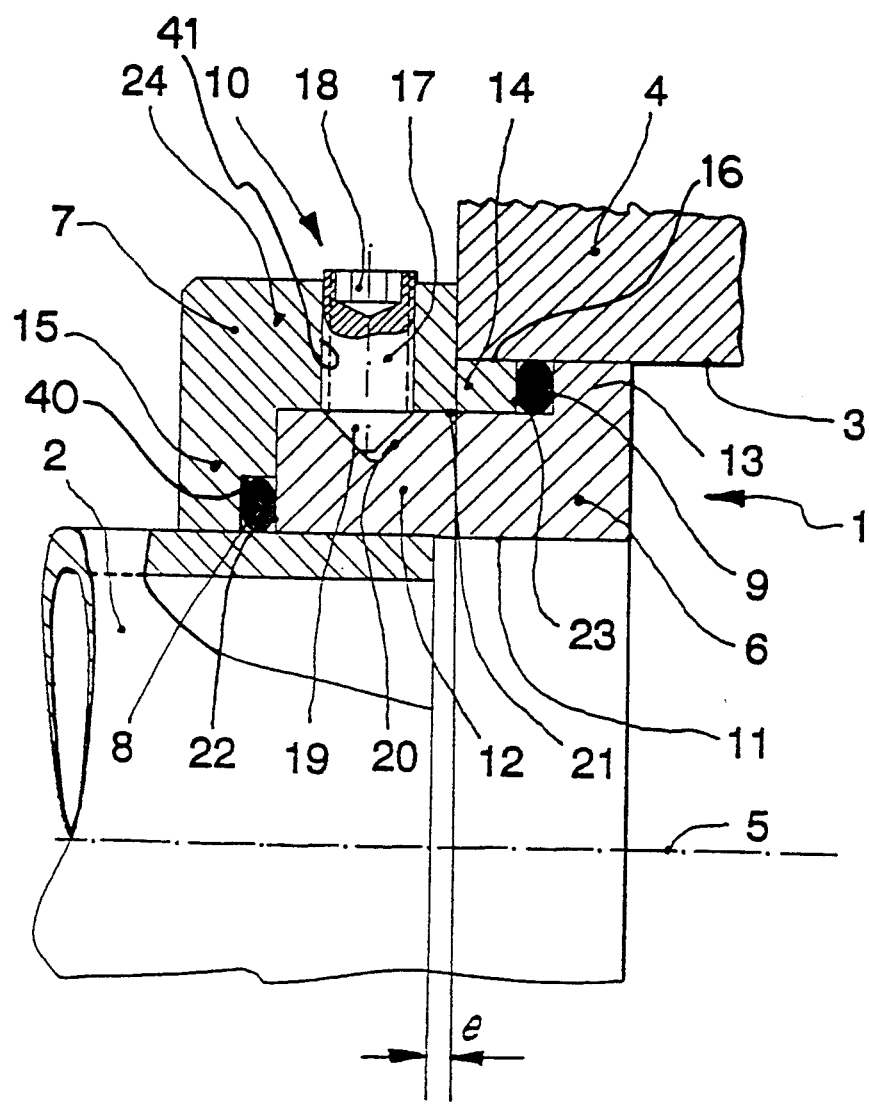
FIG. 1 is a fragmentary elevational view in partial section of a first embodiment of connector assembly embodying the present invention.

A first embodiment of a connection assembly is illustrated in FIG. 1 and is indicated generally by the numeral 1. The connection 1 is disposed at the end of a cylindrical tubular component 2 such as a laser tube which fits into the cylindrical recess 3 of a fragmentarily illustrated component 4 such as the housing of a laser resonator. The two components 2 and 4, and the recess 3 of the component 4, are coaxial with the common axis 5. The end of the cylindrical component 2 is seen to be spaced a distance e from the outer surface of the component 4 providing the recess 3.

The connector assembly 1 for the two components 2 and 4 is generally comprised of two annular ring elements 6 and 7, two resiliently deformable annular elements 8 and 9 inserted between the ring elements 6 and 7, and an adjusting device 10 by which the two ring elements 6 and 7 can be moved axially of one another.

The inner ring shaped element 6 has a cross section which is basically L-shaped and the inner peripheral surface 11 the body portion 12 functions as an inner bushing which receives the cylindrical component 2 therein. At its inner end, the ring element 6 has a radially outwardly extending flange 13 which is in surface contact with the wall of the recess 3.

The body portion 12 of the inner ring element 6 is encompassed by the body portion 14 of the outer ring element 7, which has a radially inwardly projecting flange 15 at its outer end which extends along the outer end of the ring element 6 into surface contact with the tubular component 2. The inner end portion 16 of the body member 14 of the outer ring element 7 is of reduced diameter and extends into the cylindrical recess 3 and provides radial and axial shoulders in surface contact with the component 4.

Between the inner end 23 of the outer bushing 14 and the flange 13 on the inner ring element 6 is the resiliently deformable annular ring element 9. To seat the resiliently compressible element 8, the flange 15 is provided with an annular recess 40 into which the elastic element 8 is inserted. The deformable element 8 is thus disposed between the surface 22 of the inner ring element 6 and the radial flange 15 of the outer ring element 7.

In the body portion 14 of the outer ring element 7 is an adjusting device 10 which is illustrated as a set screw in this embodiment. The set screw 17 is seated in a threaded aperture 41 provided in the body portion 14 and it has a hexagonal recess 18 in outer end for receiving a drive tool (not shown). The inner end of the set screw 17 has a truncated conically shaped end portion 19, which extends into a basically V shaped groove 20 which extends about the periphery of the inner ring element 6. The angle of the side surface of the conically shaped portion 19 corresponds to the angle of the side surface of the groove 20.

As illustrated, the conically shaped portion 19 is adjacent the outer side surface of the groove 20 and is spaced outwardly from the base of the groove 20. When the ring elements 6 and 7 are in this position, the deformable elements 8 and 9 are not deformed or tensioned between the ring elements 6 and 7 and against the components 2 and 4. If the set screw 17 is screwed downwardly into the threaded aperture 41 with an appropriate tool, the conically shaped end portion 19 moves radially in the direction of the base of the groove 20, and this movement causes the ring element 6 to move outwardly or to the left as seen in FIG. 1, to provide centering of the groove 20 about the conically shaped end portion 19.

As the inner ring element 6 is pushed (to the left) against the outer ring element 7, the deformable elements 8 and 9 are deformed between them. As a result, the compressible elements 8 and 9 have increased surface contact with the components 2 and 4 and tension them with the ring elements 6 and 7. On the one hand, this effects a resilient connection and, on the other hand, it seals the inner surfaces of the components 2 and 4 to the environment and it makes the adjacent surfaces inwardly thereof impervious to passage of fluids. This sealing position of the compressible elements 8 and 9 and the ring elements 6 and 7 is represented by the adjusted position as shown in FIG. 1.

In this displacement of the inner ring element 6 the compressible elements 8 and 9 are pressed between the flanges 13 and 15 and the inner surfaces 22 and 23 of the ring elements 6 and 7, and the outer ring 7 slides on the circumferential guide surface 21 of the inner ring 6, which guarantees that the two ring bushings move solely in the axial direction and do not tilt. Moreover, it can be seen that the threaded aperture 41 for the set screw 17 is formed in a relatively thick outer body portion 14 which has a thickness substantially equal to the length of the set screw 14.

Figure 2:
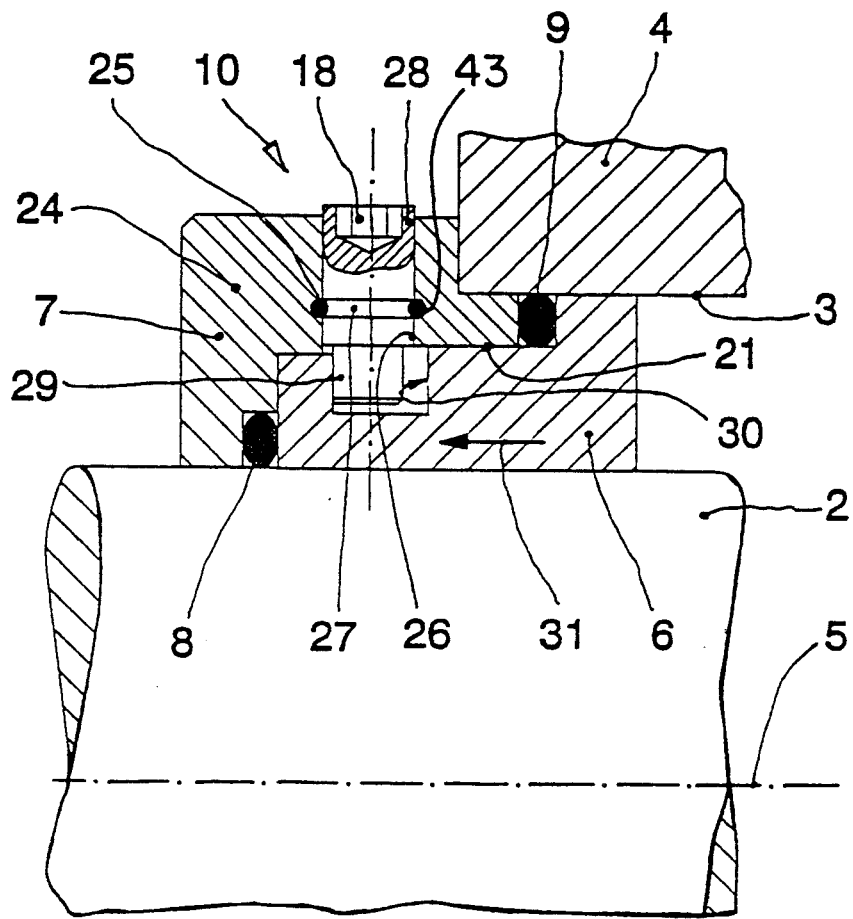
FIG. 2 is a similar view of a second embodiment of the connector assembly embodying the present invention.

In the embodiment shown in FIG. 2, instead of an internal thread seating a conically tipped set screw 17, the ring element 7 has a radial bore 26 with a snap ring groove 43 extending thereabout intermediate its length which seats a holder 25 designed as a tension ring. The adjustment device 10 is inserted into the bore 26, and it has snap ring groove 27 intermediate its length and into which the holder 15 also seats, thus holding the adjustment device 10 in the bore 26 in an axially fixed position and so that it cannot be inadvertently dislodged. In addition, the adjustment device 10 is secured by the holder 15 against rotating without intended manipulation thereof.

The adjustment device 10 is designed as an eccentric bolt 28 in the embodiment shown in FIG. 2 and it has a hexagonal recess 18 in its radial outer end and a cylindrical eccentric portion 29 on its radial inner end disposed off the center axis on the bolt 28. This cylindrical portion 29 extends above the inner surface of the body portion 14 and it extends radially inwardly into a circumferential groove 30 in the inner ring element 6. The axial width of the groove 30 is greater than the diameter of the eccentric portion 29.

When the eccentric bolt 28 is turned by a tool which seats in its hexagonal recess 18, the eccentric portion 29 has its peripheral surface bearing on the side surface of the groove 30 and this causes the ring element 6 to move in the direction of the arrow 31 because the eccentric portion 29 is moved eccentrically of the axis of the eccentric bolt 28. In this embodiment, simple rotational movement of the adjusting device 10 is transferred into an axial motion of the ring element 6 in the direction of the arrow 31. Thus, the inner ring element 6 slides along the guide surface 21 into the body portion 14 of the ring element 7. When the ring element 6 is thus moved in relation to the ring element 7, the deformable elements 8 and 9, which may be O-rings, are deformed and their surface area is increased along the adjacent surfaces of the components 2 and 4, and these components are engaged with one another by this action. Moreover, the interior of the component 4 is sealed to the environment and to liquids.

Figure 3:
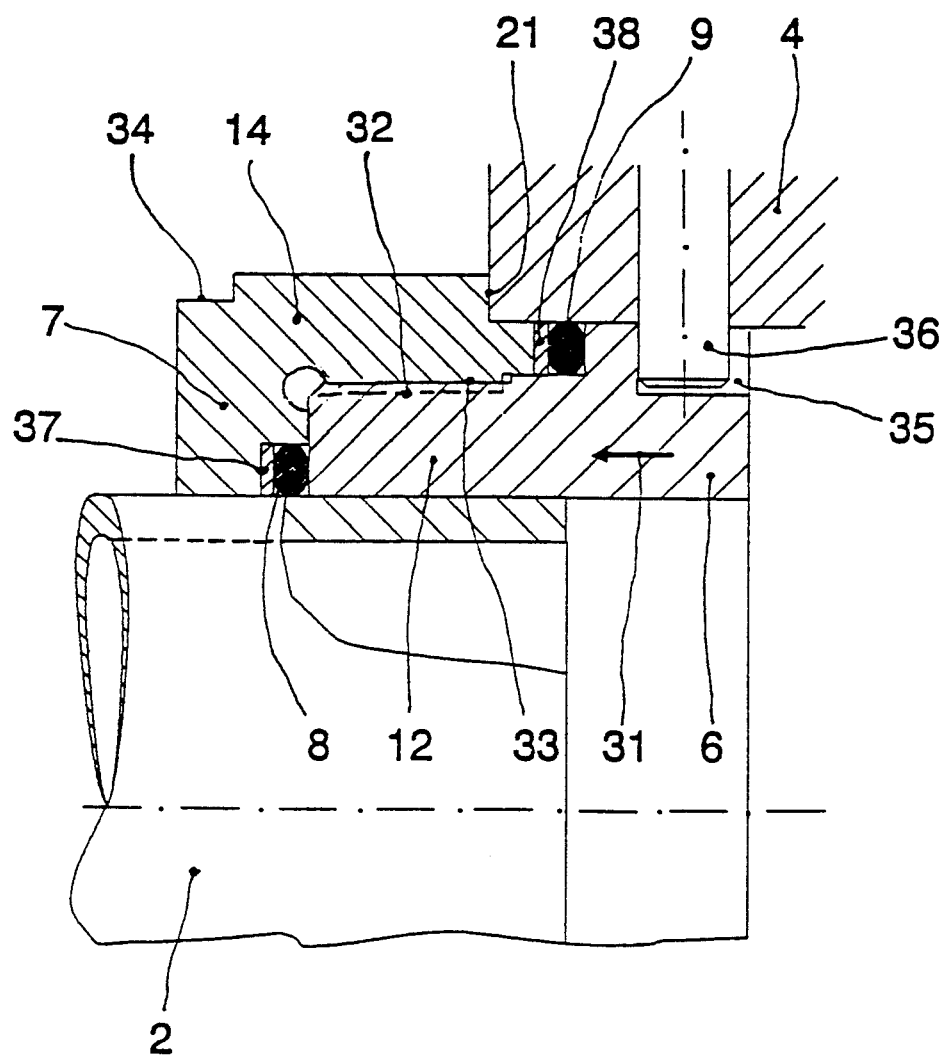
FIG. 3 is a third embodiment of a connector assembly embodying the present invention.

In the embodiment shown in FIG. 3, the outer surface of the body portion 14 of the ring element 7 has an internal thread 32 and the body portion 12 of the inner ring element 6 has an external thread 33. Conveniently, the ring element 7 has an outer end portion 34 of hexagonal configuration to permit driving engagement by a tool, such as a wrench or the like, by which the ring element 7 can be turned on the ring element 6. In addition, a recess 35 can be provided in the inner ring element 6, and a bolt 36 can extend through the component 4 into the recess 35. This bolt 36 serves as a device to preclude turning of the inner ring element 6. Instead of the outer hexagon, a knurl can also be provided, so that, when the threads 32 and 33 are designed as fine threads, the outer ring element 7 can be moved by hand toward the inner ring element 6.

Thus, if the outer ring element 7 is turned relative to the inner ring element 6, the inner ring element 6 moves outwardly in the direction of the arrow 31. Thus, both deformable elements 8 and 9 are resiliently deformed as in the previous forms of embodiment. To prevent the turning motion of the ring elements 6 and 7 from being transferred to the compressible elements 8 and 9, rigid rings 37 and 38 maybe inserted into the recesses adjacent the deformable elements 8 and 9. If desired, disks 37 and 38 can be provided on both sides of each deformable element 8 and 9.

As will be readily appreciated, in each of the illustrated embodiments the body portion of the outer ring element rides along the body portion of the inner ring element and the closely spaced axially elongated surfaces preclude any significant relative tilting of the two ring elements, or misalignment with the components being assembled. The resiliently deformable elements which are disposed between the flanges and the body portions at the two ends of the assembly ensure tight sealing and frictional engagement with the component against which they bear, and the amount of force exerted thereby can be adjusted easily by rotation of the adjustable element in the first two embodiments or by rotation of the two elements relative to each other in the case of the third embodiment.

Although at various points in the description and claims, the ring elements are indicated as having portions in close surface contact or relationship with the components about which they are being assembled, in reality a small spacing will normally be provided between the adjacent surfaces of the connector elements and the components being assembled, and the resiliently deformable elements will bridge the distance therebetween to effect the frictional engagement of the components and the sealing action when the resilient elements are deformed as a result of the relative axial movement of the ring elements. Similarly, the outer ring element is in close surface relationship with the outer surface of the inner ring element, but a small clearance on the order of 0.1–0.3 millimeters will normally be provided to avoid binding while, at the same time, preventing undue relative radial displacement or tilting.

As will also be appreciated, both resiliently deformable elements are acted upon concurrently during axial movement of the one ring element relative to the other in the adjustment process. This tends to balance the tensioning forces operating between the connector assembly and the housing and between the connector assembly and the tubular component.

It will also be appreciated that the grooves shown in the first two illustrated embodiments may be replaced by spaced recesses of the desired configuration at several locations about the periphery of the inner ring element.

Preferably, multiple adjustment elements are provided about the periphery of the connector assembly so that the forces acting to provide the relative axial movement and deformation of the resiliently deformable elements may be more closely controlled and balanced, thus avoiding any tendency for skewing of the elements relative to each other and disproportionate clamping force about the periphery of the ring elements.

In the embodiment of FIG. 2, the snap ring along the length of the adjustable element is desirable from the standpoint of precluding inadvertent movement of the adjustable element outwardly of the outer ring element so that it might be lost. In addition, it positions the adjusting element in its desired radial position once the adjusting element is inserted into the bore of the outer ring element. As will be appreciated, in both the first and the second embodiments, the adjusting element must be positioned radially outwardly of the inner periphery of the outer ring element to permit the ring elements to be assembled.

The stepped configuration for the inner end of the body portion of the outer ring element is advantageous since it reduces the radial dimension of the connector assembly for purposes of insertion into the recess of the housing or like component while at the same time providing a substantially thick body portion to resist the stresses which occur upon the connector assembly during usage.

Moreover, it will be appreciated that the cylindrical component need not actually extend into the recess of the other component in view of the excellent sealing arrangement provided by the connector assembly of the present invention. For example, in the illustrated embodiments, the tubular components are shown as terminating both within and without the recess in the housing component.

The resiliently deformable elements may be fabricated from a variety of materials, and they may also utilize a variety of configurations. Although metallic spring elements may be adapted to this application, the preferred elements are fabricated from resiliently deformable elastomeric materials. Moreover, although the elements have been shown as having a circular cross section, the preferred cross section is trianglar or dome shaped with the base of the triangle or dome being disposed adjacent the surface of the component. In this fashion, when the element is deformed by the radial movement of the ring elements, a relatively large surface area is provided in contact with the component to enhance the frictional engagement provided by the clamping pressure and the quality of the seal. However, rectangular cross sections and other cross sections will function effectively depending upon the durometer of the element and its cross sectional area.

Thus, it can be seen from the foregoing detailed description and attached drawings that the novel connector assembly of the present invention is relatively simple to fabricate and assemble, and it occupies relatively small radial dimension. The connector assembly effects good sealing action about the components, and in which the connecting force may be adjusted readily.

Having thus described the invention, what is claimed is:

1. A connector assembly for resiliently actuated coupling of a first component of cylindrical configuration to a second component with a cylindrical recess, comprising:
    (a) a pair of interfitting inner and outer annular ring elements having first and second axial ends and axially extending overlying body portions, said first ends being dimensioned to extend inwardly of the recess in the associated second component with said second ends being spaced outwardly thereof and in surface contact with the circumferential surface of the associated first cylindrical component, said inner ring element having a radially outwardly extending flange at its first end dimensioned to extend into close surface relationship with the wall of the recess of the second component and beyond the first end of the body portion of the outer ring element, and said outer ring element having a radially inwardly extending flange at its second end dimensioned to extend along said second end of said inner ring element into close surface relationship with the cylindrical first component;
    (b) resiliently deformable annular elements disposed between the radial flange of each of said ring elements and the body portion of the other ring element; and
    (c) adjusting means for effecting axial movement of the ring elements relative to each other to effect deformation of the resiliently deformable elements, thereby producing tensioning forces between the deforming elements and the component in surface contact therewith to secure the components in assembly.

2. A connector assembly according to claim 1 wherein said adjusting means additionally secures said ring elements in axial assembly.

3. A connector assembly according to either of claims 1 and 2 wherein said adjusting means is comprised of cooperating elements disposed on said ring elements.

4. A connector assembly according to claim 3 in which said cooperating elements comprise a radially adjustable element adjustably seated in said outer ring element with a surface portion at its inner end which cooperates with the surface of a recess in said inner ring element so that movement of the adjustable element produces said relative axial movement of said ring elements.

5. A connector assembly according to claim 4 in which said surface portion of said adjustable element is provided by an eccentrically oriented, generally cylindrical end portion, and the cooperating surface of said recess in said inner ring element is the side surface of an annular groove in the outer periphery of said inner ring element.

6. A connector assembly according to claim 4 in which said surface portion of said adjustable element is a conically surfaced end portion and the cooperating surface of said recess is provided by an inclined side surface of a groove in the periphery of said inner ring element.

7. A connector assembly according to any one of claims 3–6 wherein said cooperating element includes an adjustable element which moves radially of said outer ring element.

8. A connector assembly according to claim 6 wherein said groove extends about the circumference of said inner ring element and is of generally v-shaped cross section.

9. A connector assembly according to any one of claims 3–6 or 8 characterized by the fact that said cooperating elements include an adjustable element which is rotatable on one of the ring elements to effect adjustment of said one of said ring elements relative to the other.

10. A connector assembly according to claim 1 in which several adjustment means are evenly spaced about the periphery of said ring elements.

11. A connector assembly according to claim 1 wherein said resiliently deformable elements are elastomeric sealing rings of generally circular cross section.

12. A connector assembly according to claim 3 in which the cooperating elements include an element which is secured against inadvertent disassembly from said outer ring member by holding means in said outer ring element.

13. A connector assembly according to claim 2 wherein said adjusting means comprises overlying adjacent axially extending portions of said ring elements being cooperatively threaded to effect adjustably threaded engagement thereof.

14. A connector assembly according to claim 1 in which said body portion of said outer ring element has a portion of reduced diameter at its first end providing an axial shoulder adapted to seat against the side surface of the recess and a radial shoulder adapted to seat against the surface of the second component outwardly of its recess.

15. A connector assembly according to claim 1 wherein said flange on said outer ring element has a recess in the periphery of its face adjacent said inner ring element in which said annular element is disposed in surface contact with the end of said inner ring element.

* * * * *